United States Patent
Zhang et al.

(10) Patent No.: US 12,282,485 B2
(45) Date of Patent: Apr. 22, 2025

(54) WORD EMBEDDING QUALITY ASSESSMENT THROUGH ASYMMETRY

(71) Applicant: INTERNATIONAL BUSINESS MACHINES CORPORATION, Armonk, NY (US)

(72) Inventors: Wei Zhang, Acton, MA (US); Yang Yu, Acton, MA (US); Murray Scott Campbell, Yorktown Heights, NY (US); Sadhana Kumaravel, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 17/005,471

(22) Filed: Aug. 28, 2020

(65) Prior Publication Data

US 2022/0067051 A1    Mar. 3, 2022

(51) Int. Cl.
*G06F 40/237* (2020.01)
*G06F 16/2457* (2019.01)
*G06F 40/30* (2020.01)
*G06N 3/02* (2006.01)

(52) U.S. Cl.
CPC ...... *G06F 16/24578* (2019.01); *G06F 40/237* (2020.01); *G06N 3/02* (2013.01); *G06F 40/30* (2020.01)

(58) Field of Classification Search
CPC ............................. G06F 16/3347; G06F 40/279
See application file for complete search history.

(56) References Cited

U.S. PATENT DOCUMENTS

| | | | |
|---|---|---|---|
| 10,142,276 B2 | 11/2018 | Rapaport | |
| 10,372,814 B2 | 8/2019 | Gliozzo | |
| 10,579,729 B2 | 3/2020 | Gliozzo | |
| 11,263,209 B2 * | 3/2022 | Bowden, Jr. | G06F 16/24575 |
| 2017/0116178 A1 | 4/2017 | Rangarajan | |
| 2021/0109995 A1 * | 4/2021 | Mihindukulasooriya | G06F 40/268 |
| 2021/0136096 A1 * | 5/2021 | Janakiraman | G06F 40/30 |
| 2021/0182328 A1 * | 6/2021 | Rollings | G06F 16/313 |
| 2021/0279420 A1 * | 9/2021 | Jain | G06V 30/414 |

OTHER PUBLICATIONS

"Method and System for Enabling Word-Node Embedding and Learning Word Vector Joint Representations", An IP.com Prior Art Database Technical Disclosure, Authors et. al.: Disclosed Anonymously, IP.com No. IPCOM000260842D, IP.com Electronic Publication Date: Dec. 27, 2019, 3 pages.

(Continued)

*Primary Examiner* — Hau H Hoang
*Assistant Examiner* — Pedro J Santos
(74) *Attorney, Agent, or Firm* — Nicholas A. Welling

(57) ABSTRACT

An approach to determine the quality of encodings assigned to a word by a word embedding model. The approach may include determining the asymmetry of two embeddings associated with two words from a word embedding model. The asymmetry of the two words from a preexisting evocation dataset may be determined. The asymmetry of the two embeddings may be compared to the asymmetry from the evocation dataset to generate an encoding quality score.

6 Claims, 8 Drawing Sheets

(56) References Cited

OTHER PUBLICATIONS

Cao et al., "Multilingual Alignment of Contextual Word Representations," Published as a conference paper at ICLR 2020, arXiv:2002.03518v2 [cs.CL], Feb. 12, 2020, 15 pages.
Faruqui, Manaal, "Diverse Context for Learning Word Representations", CMU-LTI-16-008, Submitted in partial fulfillment of the requirements for the degree of Doctor of Philosophy in Language and Information Technologies, 2016, 106 pages.
Lee et al., "Method and System for Joint Embedding of Query and Ad by Leveraging Implicit Feedback", An IP.com Prior Art Database Technical Disclosure, IP.com No. IPCOM000257007D, IP.com Electronic Publication Date: Jan. 10, 2019, Copyright: Yahoo! 2019, 4 pages.
Nematzadeh et al., "Evaluating Vector-Space Models of Word Representation, Or, the Unreasonable Effectiveness of Counting Words Near Other Words", 2017, 6 pages.
Zablocki et al., "Learning Multi-Modal Word Representation Grounded in Visual Context", The Thirty-Second AAAI Conference on Artificial Intelligence (AAAI-18), Association for the Advancement of Artificial Intelligence, 2018, 8 pages.

\* cited by examiner

WORD EMBEDDING QUALITY ASSESSMENT THROUGH ASYMMETRY

BACKGROUND OF THE INVENTION

The present invention relates generally to the field of word meaning representation, and more specifically to measuring the quality of word representations of word embedding models through the degree of asymmetry between words.

Word representations such as static embeddings and contextualized embeddings attempt to assign a meaning representation to a word from a corpus. State of the art word embedding models utilize neural networks to encode vectors to words, embedding the word into a fixed number dimensional space, thus representing the words within the dimensional space from the corpus. Words with similar meanings cluster together within the dimensional space. Further, some embedding models can account for other words around a target word, and encode vectors given the context of the target word. The quality of embeddings is typically evaluated against human judgement word pair similarity. In some cases, the quality of the word representation is determined by comparing the symmetry of two words within the embedding.

SUMMARY

Embodiments of the present disclosure include a computer-implemented method, computer program product, and a system for generating an embedding quality score based on an embedding of a first word and an embedding of a second word.

In some embodiments, a first asymmetry score for the embedding of the first word and the embedding of the second word can be generated. Further, a second asymmetry score based on evocation data for the first word and evocation data for the second word can be generated. Additionally, a spearman correlation based on the first asymmetry score and the second asymmetry score can be generated.

The above summary is not intended to describe each illustrated embodiment of every implementation of the present disclosure.

Figure 1:
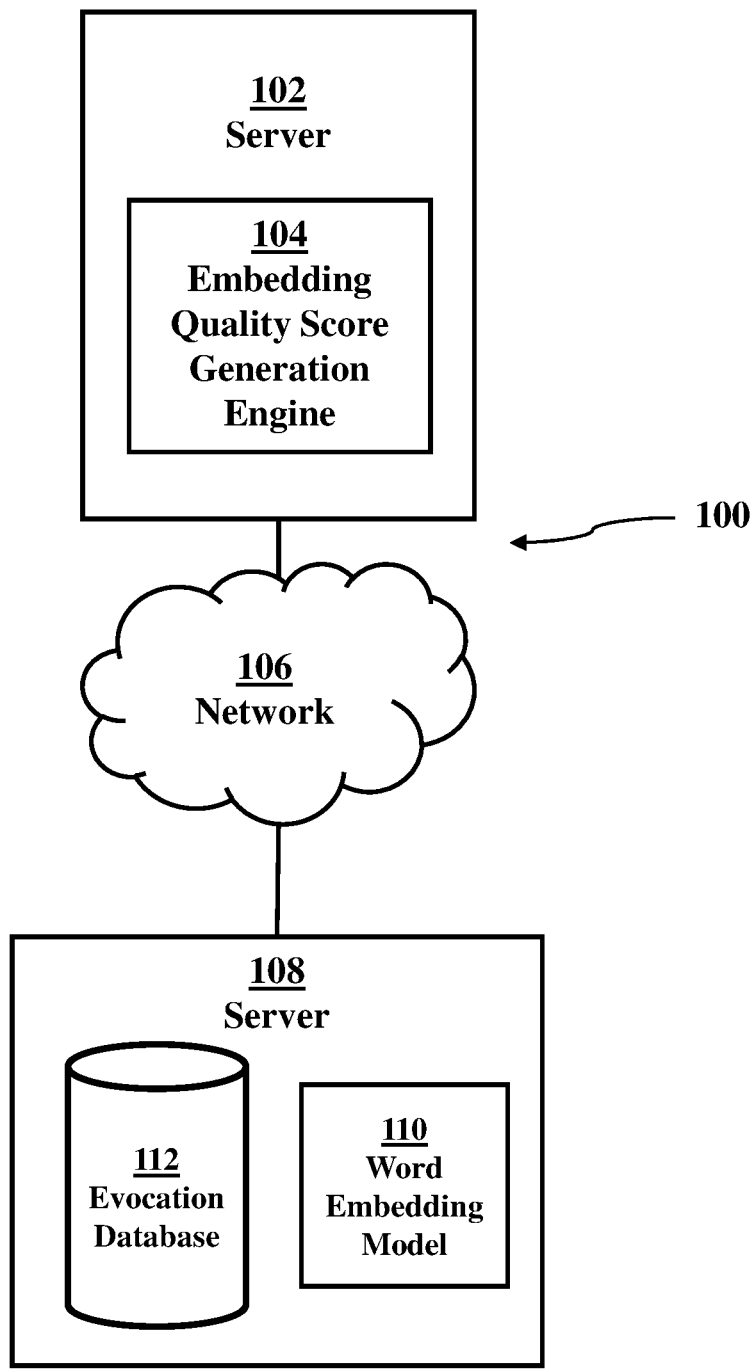
FIG. 1 is a functional block diagram generally depicting a word embedding quality score generation environment, in accordance with an embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The embodiments depicted and described herein recognize the benefits of generating an embedding quality score, more specifically determining the quality of a word embedding model encoding by determining asymmetry between the embeddings of the word embedding model and the asymmetry of the same words in the evocation database.

FIG. 1 is a functional block diagram depicting, generally, a word embedding quality score generation environment 100. Word embedding quality score generation environment 100 comprises embedding quality score generation engine 104 operational on server 102, word embedding model 110 operational on server 108, evocation database 112 stored on server 108 and network 106 supporting communications between the server 102 and server 108. As shown in FIG. 1, server 108 can access embedding quality score generation engine 104 via network 106. It should be noted, while only server 102 and server 108 are shown in word embedding quality score generation environment 100, this is for ease of description, as multiple servers can be included within the environment (i.e. 1, 2, n . . . n+1).

Server 102 and server 108 can be a standalone computing device, a management server, a web server, a mobile computing device, or any other electronic device or computing system capable of receiving, sending, and processing data. In other embodiments, server 102 and server 108 can represent a server computing system utilizing multiple computers as a server system. In another embodiment, server 102 and server 108 can be a laptop computer, a tablet computer, a netbook computer, a personal computer, a desktop computer, or any programmable electronic device capable of communicating with other computing devices (not shown) within word embedding quality score generation environment 100 via network 106.

In another embodiment, server 102 and server 108 represent a computing system utilizing clustered computers and components (e.g., database server computers, application server computers, etc.) that can act as a single pool of seamless resources when accessed within word embedding quality score generation environment 100. Server 102 and server 108 can include internal and external hardware components, as depicted and described in further detail with respect to FIG. 6.

Embedding quality score generation engine 104 can be a module for receiving word embeddings, generating an asymmetry score from the embeddings, retrieving evocation data for words associated with the embeddings, generating an asymmetry score from the evocation data, comparing the generated asymmetry scores from the embeddings and evocation data and generating an embedding quality score (described further below). It should be noted, FIG. 1 shows embedding quality score generation engine 104 operational on only one computing device, in some embodiments embedding quality score generation engine 104 may be operational on one or more computing devices or within a cloud computing system. Embedding quality score generation engine 104 may perform some actions described above on the same computing device or different computing devices.

Network 106 can be, for example, a local area network (LAN), a wide area network (WAN) such as the Internet, or a combination of the two, and can include wired, wireless, or fiber optic connections. In general, network 106 can be any combination of connections and protocols that will support communications between server 102 and server 108.

Word embedding model 110 can generate word representations (e.g. semantic meaning) from a provided corpus. A word embedding model can be static (e.g., Word2Vec, Skip-gram, Bag-of-Words, fastText, and Global Vectors (GloVe)) or the word embedding model can be contextual (e.g., Bi-directional encoder representation). In some embodiments, word embedding model 110 can be associated with a neural network (e.g. recurrent neural network, long-short term memory neural network, gated recurrent neural network, and transformer neural network). Word embedding model 110 can assign vectors (e.g. encoding features) and embed words in an N-dimensional space. Hereinafter, the n vectors assigned to a word from a corpus, by word embedding model 110, shall be referred to as a word embedding. It should be noted, the word embedding is the word representation within the n-dimensional space. Additionally, during training word embedding model 110 can be supervised, unsupervised, or semi-supervised. It should be noted, while in FIG. 1 word embedding model 110 is shown operational on server 108, it may be operational on any computing device communicating, via network 106, with embedding quality score generation engine 104 or on a local computing device with embedding quality score generation engine 104.

Evocation database 112 can be a database containing word evocation datasets. Word evocation datasets can be datasets of statistical data (e.g., count-based probabilities) in which one word evokes the recall of another word. Examples of word evocation datasets can be "Florida Word Association Norms," "Edinburgh Association Thesaurus," and "Small World of Words." In some embodiments, more than one evocation dataset can be stored on evocation database 112. It should be noted, while evocation database 112 is located on server 108, it may be located on any computing device that is accessible by embedding quality score generation engine 104 via network 106 or on a local computing device (i.e. a non-network device) to embedding quality score generation engine 104. In an embodiment, evocation database 112 can be a set of human annotated rankings, in which humans rate the similarity between words.

Figure 2:
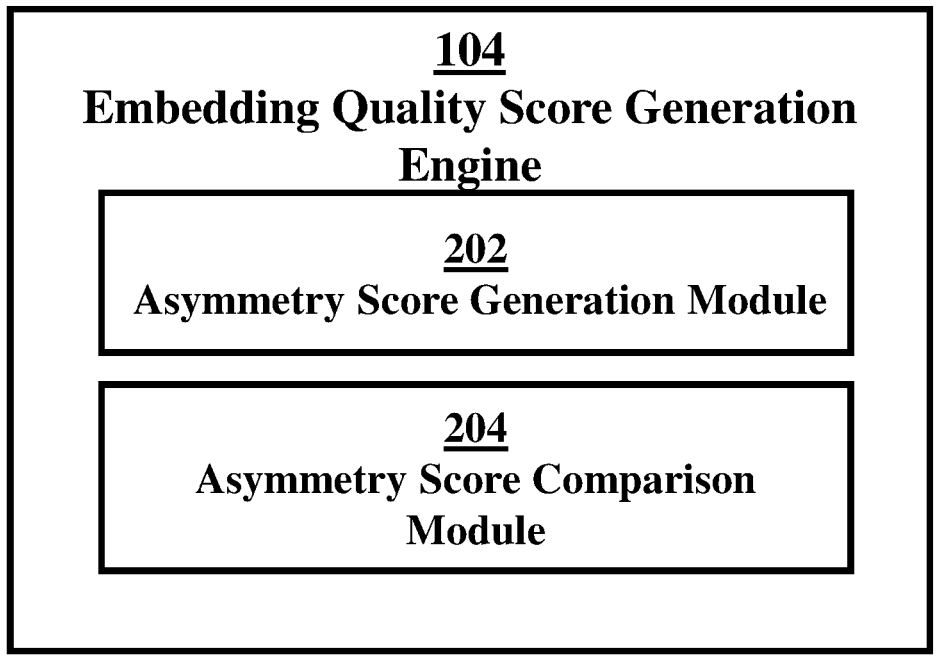
FIG. 2 is a functional block diagram depicting an embedding quality score generation engine, in accordance with an embodiment of the present invention.

FIG. 2 is functional block diagram 200 of embedding quality score generation engine 104. Asymmetry score generation module 202 and asymmetry score comparison module 204 are shown operational within embedding quality score generation engine 104.

Asymmetry score generation module 202 is a computer module capable of receiving or retrieving word embeddings for one or more words from word embedding model 110. In some embodiments, asymmetry score generation module 202 can generate an asymmetry score for the word embedding from word embedding model 110. In some embodiments, asymmetry score generation module 202 can retrieve data corresponding to the word embedding from evocation database 112. In some embodiments, asymmetry score generation module can calculate a log asymmetry ratio. The log asymmetry can be calculated as follows:

$$LAR(a;b) = \log P(a|b) - \log P(b|a)$$

where LAR is the log asymmetry ratio for word "a" and word "b". The log of the conditional distribution probability "P" for word "a" where word "b" is present minus the log of the conditional distribution probability "P" of word "b" where word "a" is present. Further, in some embodiments if the word embeddings are from a contextual word embedding module the conditional distribution probability for the words can be calculated as follows:

$$P_B(b|a) = \Sigma_{c \in C(a,b)} P_B(b|a,c) P(c|a)$$

Where "c" is the context vector from the word embedding model 110 for word "a." Further, the conditional distribution probability can then be normalized with a Soft-max function as follows:

$$P(b|a) = \frac{\exp(P(b|a))}{\sum_c \exp(P(c|a))}$$

In some embodiments, asymmetry score generation module 202 can generate a log asymmetry ratio for words "a" and "b" using the data from evocation database 112 associated with words "a" and "b." Further, asymmetry score generation module 202 can generate a log asymmetry ratio using the same equations as above. It should be noted, utilizing the same equations is not necessary as long as a correlating asymmetry ratio can be generated from the data associated with word "a" and "b." In some embodiments, the relation of a word can be determined, for example word "a" and "b" may be a hyponym-hypernym pair, antonyms, synonyms, in a similar genus, the same part-of-speech, etc. The relation of the word may be determined by analyzing data from the evocation database 112, an ontology map, and/or one or more word embedding models. Asymmetry score generation module 202 can send the generated asymmetry score to asymmetry score comparison module 204.

Asymmetry score comparison module 204 is a computer module that can receive asymmetry scores from asymmetry score generation module 202 and can generate an embedding quality score. In some embodiments, asymmetry score comparison module 204 can determine the difference between the asymmetry score of the word embedding model 110 for words "a" and "b" and the asymmetry score from the data for words "a" and "b" in evocation dataset. In some embodiments, a Spearman rank correlation can be calculated to determine the quality of the word embedding representation versus the evocation dataset (i.e. an embedding quality score). It should be noted, in some embodiments, other methods of comparing the correlation between the asymmetry score of the word embedding and the asymmetry score of the evocation datasets (e.g. Kendall tau rank correlation coefficient, distance correlation, polychoric correlation, etc.) can be utilized to generate the embedding quality score.

Figure 3:
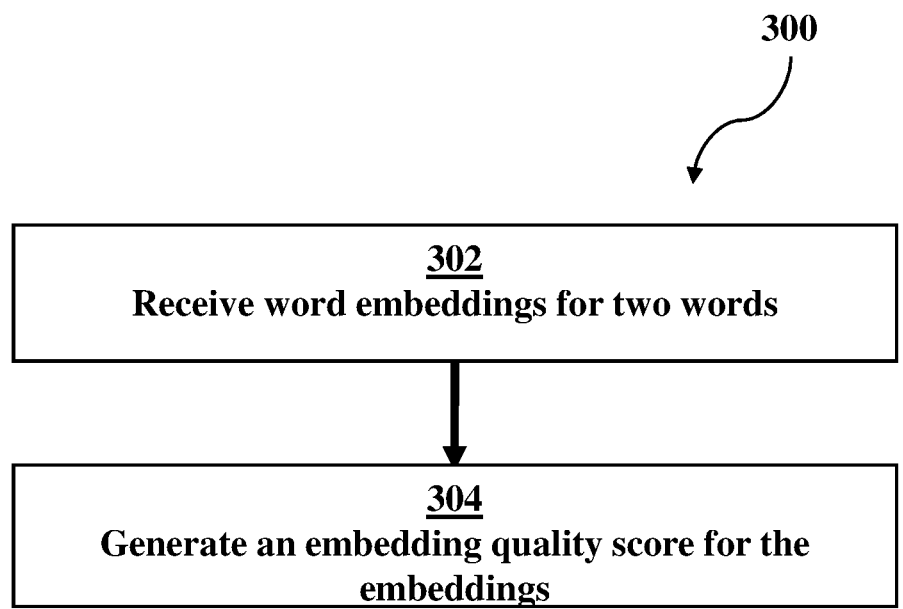
FIG. 3 is a flowchart depicting a method for generating a word embedding quality score, in accordance with an embodiment of the present invention.

FIG. 3 is a flowchart depicting a method 300 for generating an embedding quality score. At 302, one or more word embeddings are received by embedding quality score generation engine 104. In some embodiments, word embedding model 110 can send the word embeddings for an entire corpus or word embedding model can send one word embedding to embedding quality score generation engine 104. In other embodiments, embedding quality score generation engine 104 can retrieve one or more word embeddings from a database (not pictured) where the word embeddings are stored.

At 304, an embedding quality score for the embeddings is generated by embedding quality score generation engine 104. In some embodiments, an asymmetry score can be generated by asymmetry score generation module 202 for the word embedding received or retrieved at 302. The embedding quality score can be generated by a comparison of the embedding asymmetry score to an asymmetry score generated from data corresponding to the same word embedding from an evocation dataset stored on evocation database 112.

Figure 4:
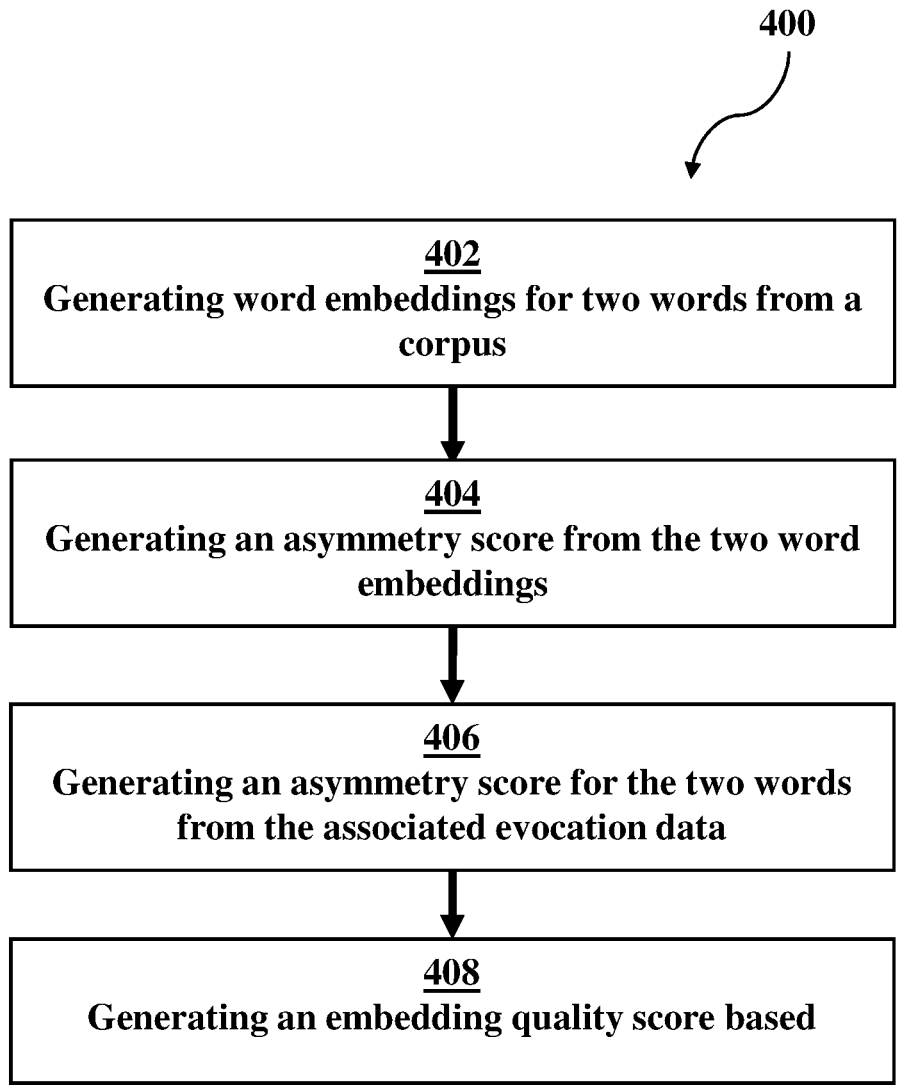
FIG. 4 is a flowchart depicting a method for generating a word embedding quality score, in accordance with an embodiment of the present invention.

FIG. 4 is a flowchart depicting a method 400 for generating an embedding quality score. At 402, two or more word embeddings are generated by word embedding model 110. In some embodiments, the word embedding model 110 consumes a corpus, such as Wikipedia, to generate an N-dimensional vector for one or more words within the corpus. Further, the word embedding model can be either static or contextual. In an embodiment, a word embedding model can require preprocessing of the corpus with a natural language preprocessing model (described further below). In some embodiments, word embedding model 110 can be operational on a local computing device or in communication with embedding quality score generation engine 104 via network 106. In either configuration, word embedding model 110 can transmit the two or more word embeddings to embedding quality score generation engine 104.

At 404, an asymmetry score generation module 202 can generate an asymmetry score for the two or more word embeddings. In some embodiments, asymmetry score generation module 202 can generate the asymmetry score by calculating the log asymmetric ratio of the two or more word embeddings.

At 406, asymmetry score generation module 202 can generate an asymmetry score from the evocation dataset associated with the two or more corresponding word embeddings. The evocation dataset can be retrieved or received from evocation database 112. Further, in some embodiments, the log asymmetric ratio of the evocation dataset corresponding to the two or more word embeddings can be calculated. The asymmetry scores can be sent to asymmetry score comparison module 204.

At 408, asymmetry score comparison module 204 can generate an embedding quality score from the asymmetry scores received from asymmetry score generation module 202. In some embodiments, asymmetry score comparison module 204 can calculate the embedding quality score with a Spearman ranking correlation.

Figure 5:
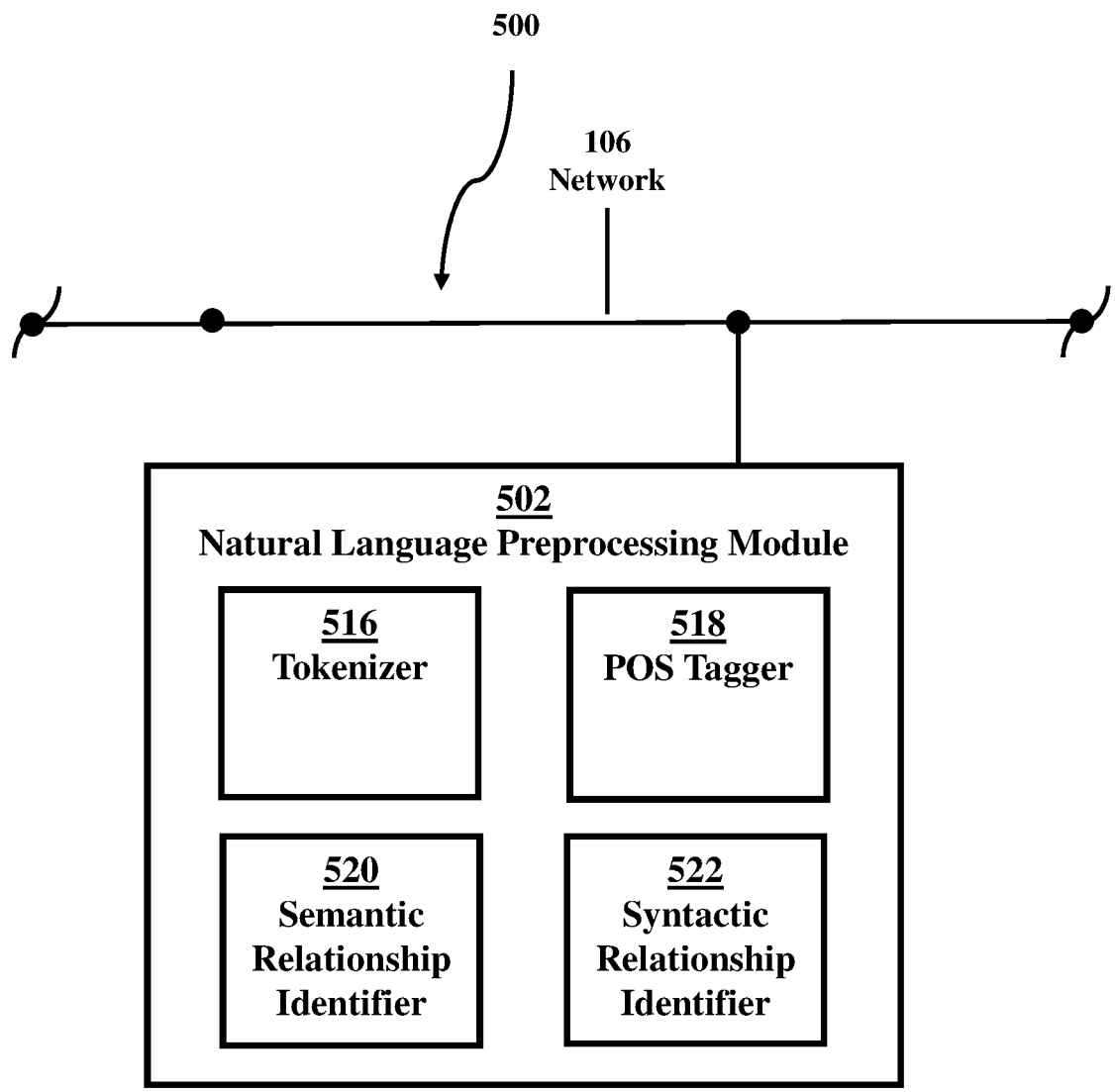
FIG. 5 is a functional block diagram of an exemplary natural language preprocessing module, in accordance with an embodiment of the present invention.

FIG. 5 is an exemplary natural language preprocessing system 500 configured to preprocess a corpus for word embedding model 110, in accordance with an embodiment of the invention. Natural language preprocessing module 502 may be operational within embedding quality score generation engine 104, word embedding model 110, or it may be a stand-alone system in communication with embedding quality score generation engine 104 via network 106. In some embodiments, word embedding model 110 may send a corpus to be analyzed to the natural language preprocessing module 502. Further, a corpus may be directly received by natural language preprocessing module 502.

The natural language preprocessing module 502 may perform various methods and techniques for preprocessing a natural language query (e.g., syntactic analysis, semantic analysis, etc.). The natural language preprocessing module 502 may be configured to recognize and analyze any number of natural languages (e.g., English, Spanish, Mandarin Chinese, Japanese, Russian, etc.). In some embodiments, natural language preprocessing module 502 may group one or more sections of a query into one or more subdivisions. Further, natural language processing module 502 may include various modules to perform analyses of a corpus. These modules may include, but are not limited to, a tokenizer 516, a part-of-speech (POS) tagger 518 (e.g., which may tag each of the one or more sections in which the particular subject is identified), a semantic relationship identifier 520, and a syntactic relationship identifier 522.

In some embodiments, the tokenizer 516 may be a computer module that performs lexical analysis. The tokenizer 516 may convert a sequence of characters into a sequence of tokens. A token may be a string of characters included in a recording and categorized as a meaningful symbol. Further, in some embodiments, the tokenizer 516 may identify word boundaries in a recording and break any text within the corpus into their component text elements, such as words, multiword tokens, numbers, and punctuation marks. In some embodiments, the tokenizer 516 may receive a string of characters, identify the lexemes in the string, and categorize them into tokens.

Consistent with various embodiments, the POS tagger 518 may be a computer module that marks up a word in a query to correspond to a particular part of speech. The POS tagger 518 may read a passage or other text in natural language and assign a part of speech to each word or other token. The POS tagger 518 may determine the part of speech to which a word corresponds based on the definition of the word and the context of the word. The context of a word may be based on its relationship with adjacent and related words in a phrase, sentence, or paragraph. In some embodiments, the context of a word may be dependent on one or more previously analyzed words in the corpus. Examples of parts of speech that may be assigned to words include, but are not limited to, nouns, verbs, adjectives, adverbs, and the like. Examples of other part of speech categories that POS tagger 518 may assign include, but are not limited to, comparative or superlative adverbs, wh- adverbs, conjunctions, determiners, negative particles, possessive markers, prepositions, wh- pronouns, and the like. In some embodiments, the POS tagger 518 may tag or otherwise annotate tokens of "an" words in a corpus with part of speech categories. In some embodiments, the POS tagger 518 may tag tokens or words of a corpus to be parsed by the natural language preprocessing module 502.

In some embodiments, the semantic relationship identifier 520 may be a computer module that may be configured to identify semantic relationships of recognized subjects (e.g., words, phrases, images, etc.) in a corpus. In some embodiments, the semantic relationship identifier 520 may determine functional dependencies between entities and other semantic relationships.

Consistent with various embodiments, the syntactic relationship identifier 522 may be a computer module that may be configured to identify syntactic relationships in a corpus composed of tokens. The syntactic relationship identifier 522 may determine the grammatical structure of sentences such as, for example, which groups of words are associated as phrases and which word is the subject or object of a verb. The syntactic relationship identifier 522 may conform to formal grammar.

Figure 6:
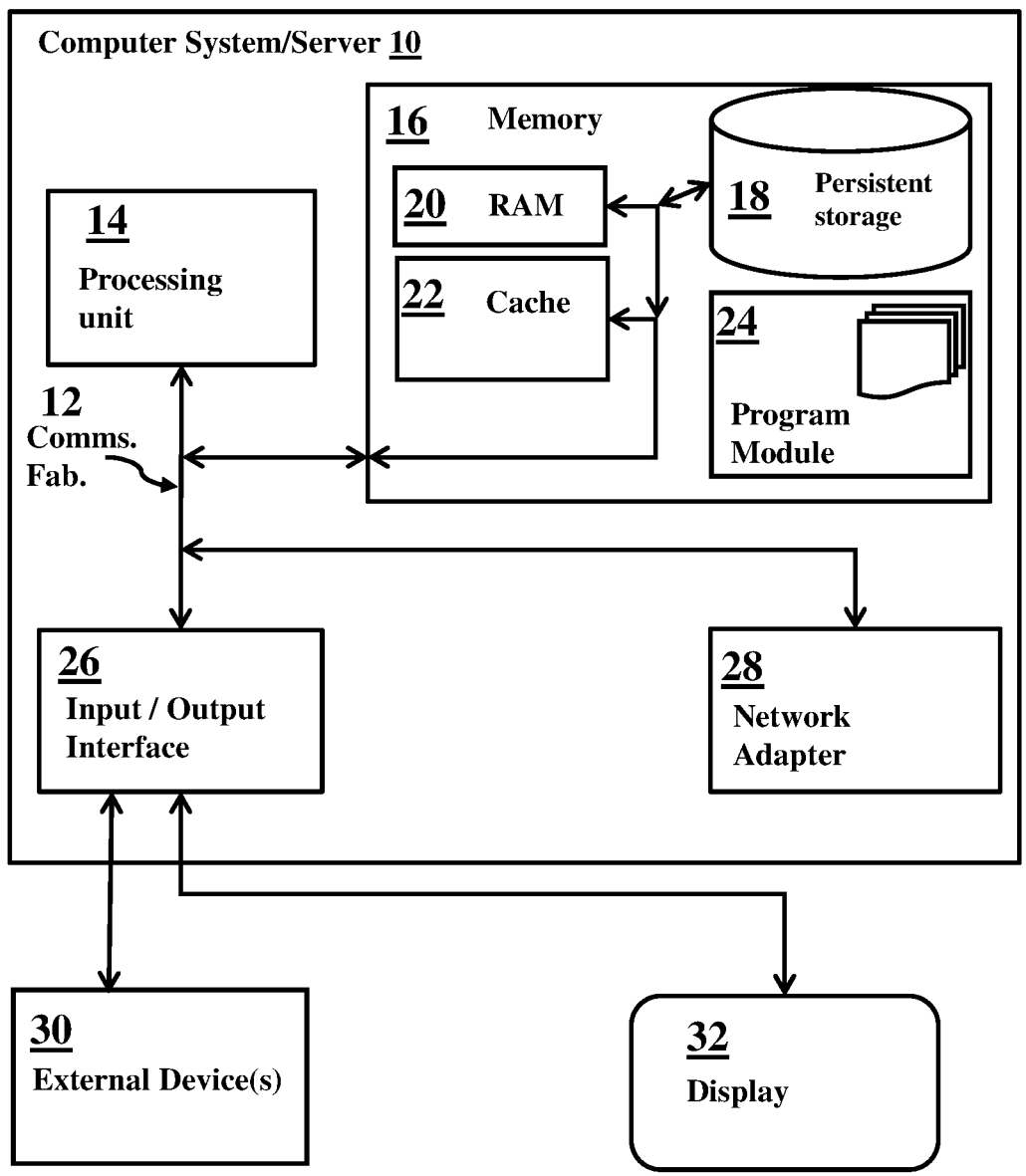
FIG. 6 is a functional block diagram of an exemplary computing system within a word embedding quality score generation environment, in accordance with an embodiment of the present invention.

FIG. 6 depicts computer system 600, an example computer system representative of server 102 and server 108 or any other computing device within an embodiment of the invention. Computer system 600 includes communications fabric 12, which provides communications between computer processor(s) 14, memory 16, persistent storage 18, network adaptor 28, and input/output (I/O) interface(s) 26. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Computer system 600 includes processors 14, cache 22, memory 16, network adaptor 28, input/output (I/O) interface(s) 26 and communications fabric 12. Communications fabric 12 provides communications between cache 22, memory 16, persistent storage 18, network adaptor 28, and input/output (I/O) interface(s) 26. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses or a crossbar switch.

Memory 16 and persistent storage 18 are computer readable storage media. In this embodiment, memory 16 includes persistent storage 18, random access memory (RAM) 20, cache 22 and program module 24. In general, memory 16 can include any suitable volatile or non-volatile computer readable storage media. Cache 22 is a fast memory that enhances the performance of processors 14 by holding recently accessed data, and data near recently accessed data, from memory 16. As will be further depicted and described below, memory 16 may include at least one of program module 24 that is configured to carry out the functions of embodiments of the invention.

The program/utility, having at least one program module 24, may be stored in memory 16 by way of example, and not limiting, as well as an operating system, one or more application programs, other program modules, and program data. Each of the operating systems, one or more application programs, other program modules, and program data or some combination thereof, may include an implementation of a networking environment. Program module 24 generally carries out the functions and/or methodologies of embodiments of the invention, as described herein.

Program instructions and data used to practice embodiments of the present invention may be stored in persistent storage 18 and in memory 16 for execution by one or more of the respective processors 14 via cache 22. In an embodiment, persistent storage 18 includes a magnetic hard disk drive. Alternatively, or in addition to a magnetic hard disk drive, persistent storage 18 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Network adaptor 28, in these examples, provides for communications with other data processing systems or devices. In these examples, network adaptor 28 includes one or more network interface cards. Network adaptor 28 may provide communications through the use of either or both physical and wireless communications links. Program instructions and data used to practice embodiments of the present invention may be downloaded to persistent storage 18 through network adaptor 28.

I/O interface(s) 26 allows for input and output of data with other devices that may be connected to each computer system. For example, I/O interface 26 may provide a connection to external devices 30 such as a keyboard, keypad, a touch screen, and/or some other suitable input device. External devices 30 can also include portable computer readable storage media such as, for example, thumb drives, portable optical or magnetic disks, and memory cards. Software and data used to practice embodiments of the present invention can be stored on such portable computer readable storage media and can be loaded onto persistent storage 18 via I/O interface(s) 26. I/O interface(s) 26 also connect to display 32.

Display 32 provides a mechanism to display data to a user and may be, for example, a computer monitor or virtual graphical user interface.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality and operation of possible implementations of systems, methods, and computer program products according to various embodiments of the present invention. In this regard, each block in the flowchart or block diagrams may represent a module, segment or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
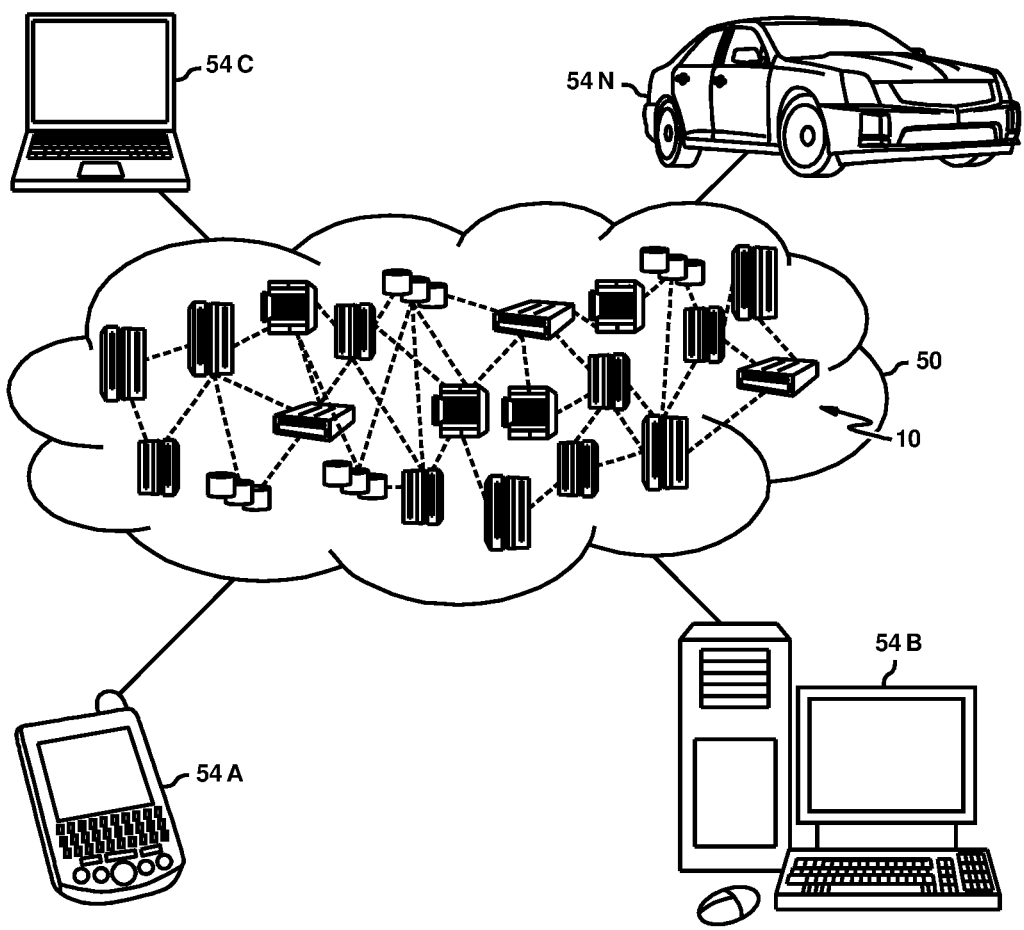
FIG. 7 is a diagram depicting a cloud computing environment, in accordance with an embodiment of the present invention.

FIG. 7 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 8:
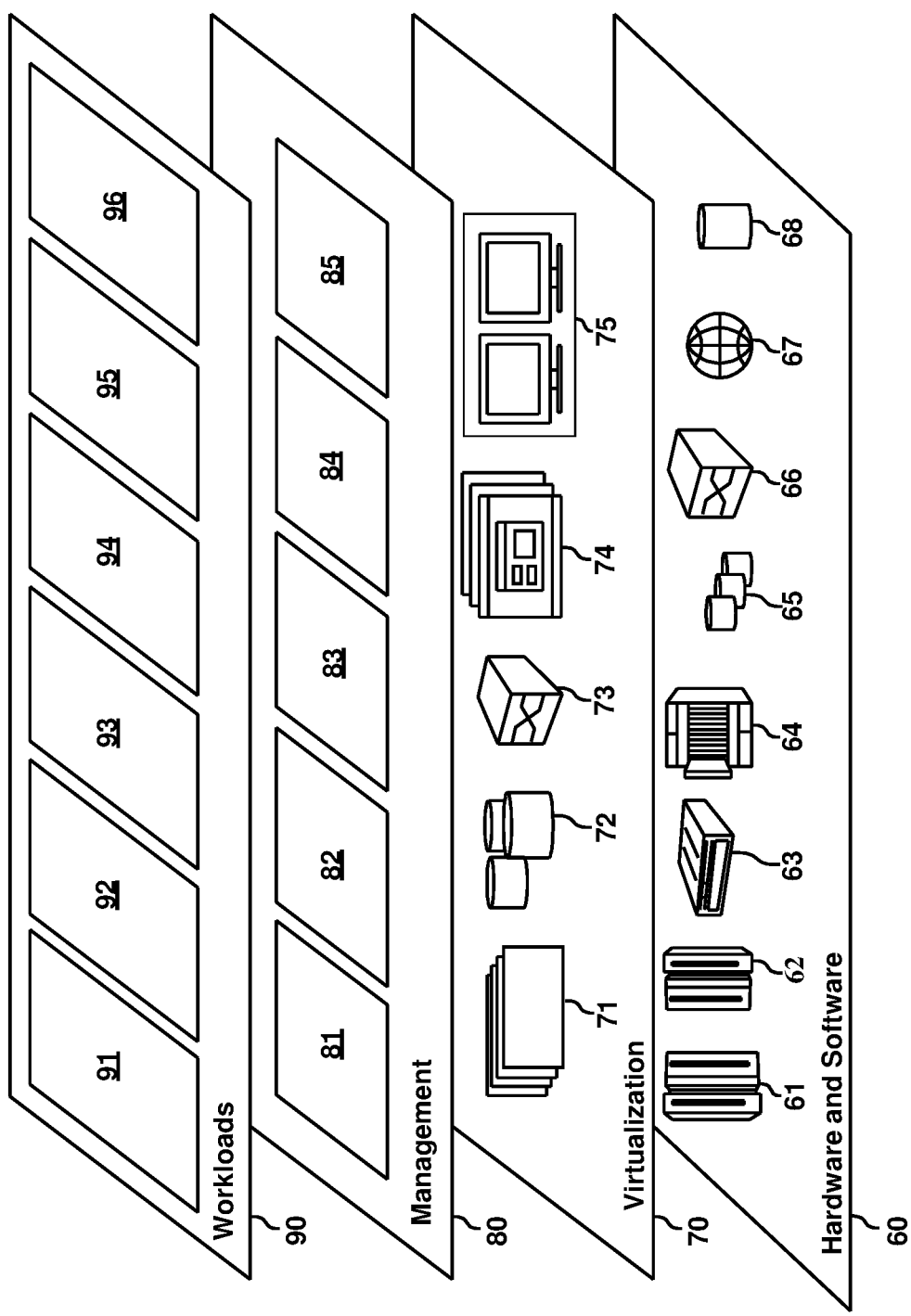
FIG. 8 is a functional block diagram depicting abstraction model layers, in accordance with an embodiment of the present invention.

FIG. 8 is a block diagram depicting a set of functional abstraction model layers provided by cloud computing environment 50 depicted in FIG. 6 in accordance with at least one embodiment of the present invention. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and embedding quality score generation 96.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method to determine the quality of word embeddings assigned by a word embedding model, the computer-implemented method comprising:
   processing, by one or more processors, a corpus, based on a natural language preprocessing system, wherein processing comprises one or more of the following techniques: tokenization, part-of-speech tagging, semantic relationship identification, or syntactic relationship identification;
   generating, by one or more processors, a word embedding for each word of a plurality of words in the processed corpus, based at least in part on a word embedding model with transformer neural network architecture, wherein generating the word embedding for each word of a plurality of words in the processed corpus further comprises assigning, by the one or more processors, a vector to each dimension within an n-dimensional space;
   generating, by the one or more processors, a first asymmetry score for the embedding of a first word from the plurality of words in the processed corpus and the embedding of a second word from the plurality of words in the processed corpus by calculating a first log asymmetric ratio of the first word and the second word;
   generating, by the one or more processors, a second asymmetry score that is a second log asymmetric ratio based, at least in part, on evocation data corresponding to the first word embedding and evocation data corresponding to the second word embedding wherein evocation data from evocation database;
   comparing, by the one or more processors, the first asymmetry score to the second asymmetry score, based on one of the following, Kendall tau rank correlation coefficient, distance correlation, or polychoric correlation;
   generating, by one or more processors, an embedding quality score that measures the quality of word representations of word embedding models through a degree of asymmetry between the first word and the second word based at least in part on the comparing of the first asymmetry score and the second asymmetry score.

2. The computer-implemented method of claim 1, further comprising:
   receiving, by the one or more processors, evocation data for a first word and a second word from an evocation dataset, wherein evocation data comprises probability relationships between a plurality of words.

3. A computer system for determining the quality of word embeddings assigned by a word embedding model, the system comprising:
   one or more computer processors;
   one or more computer readable storage media;
   computer program instructions to:
      process a corpus, based on a natural language preprocessing system, wherein processing comprises one or more of the following techniques: tokenization, part-of-speech tagging, semantic relationship identification, or syntactic relationship identification;
      generate a word embedding for each word of a plurality of words in the processed corpus, based at least in part on a word embedding model with transformer neural network architecture, wherein generating the word embedding for each word of a plurality of words in the processed corpus further comprises assigning, by the one or more processors, a vector to each dimension within an n-dimensional space;
      generate a first asymmetry score for the embedding of a first word from the plurality of words in the processed corpus and the embedding of a second word from the plurality of words in the processed corpus by calculating a first log asymmetric ratio of the first word and the second word;
      generate a second asymmetry score that is a second log asymmetric ratio based on evocation data corresponding to the first word embedding and evocation data corresponding to the second word embedding wherein evocation data from evocation database;
      compare the first asymmetry score to the second asymmetry score, based on one of the following, Kendall tau rank correlation coefficient, distance correlation, or polychoric correlation;
      generate an embedding quality score that measures the quality of word representations of word embedding models through a degree of asymmetry between the first word and the second word based at least in part on the comparing of the first asymmetry score and the second asymmetry score.

4. The computer system of claim 3, further comprising instructions to:
   receive evocation data for a first word and a second word from an evocation dataset, wherein evocation data comprises probability relationships between a plurality of words.

5. A computer program product for determining the quality of word embeddings assigned by a word embedding model, the computer program product comprising a computer readable storage media and program instructions stored on the computer readable storage media comprising instructions to:
   process a corpus, based on a natural language preprocessing system, wherein processing comprises one or more of the following techniques: tokenization, part-of-speech tagging, semantic relationship identification, or syntactic relationship identification;
   generate a word embedding for each word of a plurality of words in the processed corpus, based at least in part on a word embedding model with transformer neural network architecture, wherein generating the word embedding for each word of a plurality of words in the processed corpus further comprises assigning, by the one or more processors, a vector to each dimension within an n-dimensional space;
   generate a first asymmetry score for the embedding of a first word from the plurality of words in the processed corpus and the embedding of a second word from the plurality of words in the processed corpus by calculating a first log asymmetric ratio of the first word and the second word;
   generate a second asymmetry score that is a second log asymmetric ratio based, at least in part, on evocation data corresponding to the first word embedding and evocation data corresponding to the second word embedding wherein evocation data from evocation database;
   compare the first asymmetry score to the second asymmetry score, based on one of the following, Kendall tau rank correlation coefficient, distance correlation, or polychoric correlation;

generate an embedding quality score that measures the quality of word representations of word embedding models through a degree of asymmetry between the first word and the second word based at least in part on the comparing of the first asymmetry score and the second asymmetry score.

6. The computer program product of claim 5, further comprising instructions to:

receive evocation data for a first word and a second word from an evocation dataset, wherein evocation data comprises probability relationships between a plurality of words.

\* \* \* \* \*